US006778997B2

(12) United States Patent
Sundaresan et al.

(10) Patent No.: US 6,778,997 B2
(45) Date of Patent: Aug. 17, 2004

(54) XML: FINDING AUTHORITATIVE PAGES FOR MINING COMMUNITIES BASED ON PAGE STRUCTURE CRITERIA

(75) Inventors: Neelakantan Sundaresan, San Jose, CA (US); Anita Wai-Ling Huang, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 09/754,257

(22) Filed: Jan. 5, 2001

(65) Prior Publication Data

US 2002/0169800 A1 Nov. 14, 2002

(51) Int. Cl.[7] .............................................. G06F 17/30
(52) U.S. Cl. ........................ 707/104.1; 707/3; 707/4; 707/104.1
(58) Field of Search ...................... 707/5, 3, 4, 104.1, 707/10; 715/500, 513

(56) References Cited

U.S. PATENT DOCUMENTS

| 5,884,305 | A | | 3/1999 | Kleinberg et al. ............. 707/6 |
| 6,041,332 | A | * | 3/2000 | Miller et al. ............. 707/104.1 |
| 6,128,629 | A | * | 10/2000 | Bretschneider et al. ..... 707/203 |
| 6,199,030 | B1 | | 3/2001 | Stone |
| 6,356,899 | B1 | * | 3/2002 | Chakrabarti et al. ........... 707/5 |
| 6,513,036 | B2 | * | 1/2003 | Fruensgaard et al. .......... 707/4 |
| 6,601,075 | B1 | * | 7/2003 | Huang et al. ............ 707/104.1 |

OTHER PUBLICATIONS

Jon M. Kleinberg, Authoritative Sources in a Hyperlinked Environment, Department of Computer Science, Cornell University, May 1997.

Brin et al. "The Anatomy of a Large–Scale Hypertextual Web Search Engine".*

Kleinberg, J.M. "Authoritative Sources in a Hyperlinked Environment," Department of Computer Science, Cornell University, May 1997.

* cited by examiner

Primary Examiner—Jean M. Corrielus
Assistant Examiner—Baoquoc N To
(74) Attorney, Agent, or Firm—Lacasse & Associates, LLC; Randy W. Lacasse; Ramraj Soundararajan

(57) ABSTRACT

A method of determining well-formed web pages which are authorities on a given topic utilizing link analysis. A root set of pages is first obtained by taking a given number of the highest ranked pages returned form a textual based searching and ranking system. Each page within the set is evaluated and given a structure score which reflects how well-formed the page is. The structure score is determined by evaluating each page within the set according to a set of parameters which relate to well-formed pages. For each parameter, the page is assigned a parameter score. These parameter scores are then weighted and summed to obtain the pages structure score. Each page within the set also has corresponding hub and authority weights which are updated and maintained to determine the strongest authorities. The initial hub and authority weights of a each page are set to the corresponding structure score of the page. An iterative algorithm is then utilized to determine the strongest authorities. For each round of the algorithm, the authority weights of a page are updated by summing the hub weights of each page pointing to the page, while the hub weights of a page are updated by summing the authority weights of each page which is pointed to by the page whose hub weight is being determined. After a series of iterations, the pages having the highest authority weights are identified as the strongest authorities, with the best structure, on the query topic.

29 Claims, 6 Drawing Sheets

XML: FINDING AUTHORITATIVE PAGES FOR MINING COMMUNITIES BASED ON PAGE STRUCTURE CRITERIA

BACKGROUND OF THE INVENTION

1. Field of Invention

The present invention relates generally to the field of determining communities of hyperlinked documents. More specifically, the present invention is related to determining communities of hyperlinked documents based on the relationships of the links between the documents and the structure of the documents.

2. Discussion of Prior Art

As hyperlinked environments grow in size and complexity, it becomes increasingly difficult to locate documents relevant to a given query. One such environment which is growing at a phenomenal rate is the world wide web (WWW). As millions of on-line participants continually create hyperlinked content, there are no capabilities to impose a global structure and consequently the capability to efficiently find the most relevant documents for a broad-topic search through traditional search methods, e.g. text based queries, becomes a much more difficult challenge to overcome. For example, a user searching for information about Harvard University on the WWW utilizing a text search would receive over 80,000 pages from the search. The number of returned pages is an unmanageable number for the user and determining which ones are the most relevant would consume a considerable amount of the user's time. What the user requires is a way to locate the most central, or authoritative, pages on the topic "Harvard."

An algorithm for locating authoritative documents within a hyperlinked environment has been proposed by Jon Kleinberg in a recent paper, incorporated herein by reference, "Authoritative Sources in a Hyperlinked Environment," Proc. ACM-SIAM Symposium on Discrete Algorithms, May 1997 (also appears as IBM Research Report RJ 10076, May 1997 and is additionally available at http://www.cs.cornell.edu/home/kleinber/ on the world wide web). Kleinberg's algorithm is based on two premises. First, the implicit annotation provided by human creators of hyperlinks contains sufficient information to obtain a notion of authority. Secondly, sufficiently broad topics contain communities of hyperlinked pages. These communities comprise two sets of inter-related pages. One set comprises authorities (i.e. highly referenced) on the topic. The second set comprises pages which "point" to many of the authorities. This second set is referred to as hubs because the elements of the set represent strong central points to confer authority on the relevant pages. The two sets of pages exhibit a mutually reinforcing relationship, that is, a good hub points to many authorities while good authorities are pointed to by many hubs. This notion of hubs and authorities is utilized to determine the pages which are the most relevant on a broad topic by using an iterative algorithm to break the apparent circularity of hubs and authorities.

Increasingly, web pages are being viewed with devices other than regular desktops and standard browsers. Cell phones, palm-top computers with limited screen space and speech-based devices are a few of the alternative devices becoming prevalent. In addition, there are moves to ensure web page content is available for users with limited abilities (blind, dyslexic, illiterate, etc.). The World Wide Web Consortium Accessibility Initiative provides the documents "Web Content Accessibility Guidelines 1.0" and "Techniques for Web Content Accessibility Guidelines 1.0," both of which are incorporated herein by reference, which describe how to format pages in structured forms so that clients on the alternative devices can process the pages. The current recommendation and notes, respectively, are available from the W3C and, additionally, at http://www.w3.org/WAI/GL/WCAG10 for "Web Content Accessibility Guidelines 1.0" and http://www.w3.org/TR/1999/WAI-WEBCONTENT-TECHS-19990505/ for "Techniques for Web Content Accessibility Guidelines 1.0." To illustrate, one of the recommendations is the use of ALT text tags for images which allows browsers or support programs sitting on the client side or proxy servers to present the information contained in figures using visually-displayed text, synthesized speech or braille. For client side programs to process a page, the most important aspect of the web page is that it should follow a more stringent structure format than that allowed for traditional browsers. Poorly formed pages, while they may contain useful information, are essentially useless for clients with limited capabilities because the transform engines that pre-process these pages for rendering can not perform an adequate job. Kleinberg's algorithm determines authoritative pages irrespective of their structure. However, some of the authoritative pages are essentially useless to the individual who wishes to view them.

Therefore, there is a need to return the most authoritative pages which provide the most use, i.e., poorly formed pages need to be penalized because the pages may not be able to be displayed (visual, auditory, tactile, etc.) in a manner appropriate for the limited abilities of the browser or the user.

SUMMARY OF THE INVENTION

A method of determining the documents of a hyperlinked environment which are authorities on a given topic which most closely meet guidelines related to document structure is presented. A base set of documents which is relatively small, containing documents relevant to a given topic, and containing many of the strongest authorities on the topic is obtained. Each document within the set is evaluated and given a structure score which reflects how well-formed the document is. Each document within the set also has corresponding hub and authority weights which are updated and maintained to determine the strongest authorities. The initial hub and authority weights of each document are set to the corresponding structure score of the document. An iterative algorithm is then utilized to determine the strongest authorities. For each round of the algorithm, the authority weights of a document are updated by summing the hub weights of each document pointing to the document, while the hub weights of a document are updated by summing the authority weights of each document which is pointed to by the document whose hub weight is being determined. After a series of iterations, the documents having the highest authority weights are identified as the strongest authorities on the query topic.

In a further embodiment, the base set of documents is obtained by obtaining a root set of documents and determining the base set from the root set. A root set is first obtained by taking a given number of the highest ranked documents returned form a textual based searching and ranking system. The base set is generated from the root set by including documents which are linked to documents within the root set.

In a further embodiment, the number of documents included within the base set is limited so as to maintain a relatively small base set. All documents outside of the root set which are pointed to by documents within the root set are included. However, only a limited number of documents outside of the root set which point to documents within the root set are included.

In further embodiment, the structure score is determined by evaluating each document within the set according to a set of parameters. For each parameter, the document is assigned a parameter score. These parameter scores are then weighted and summed to obtain the documents structure score.

DESCRIPTION OF THE PREFERRED EMBODIMENTS

Figure 1:
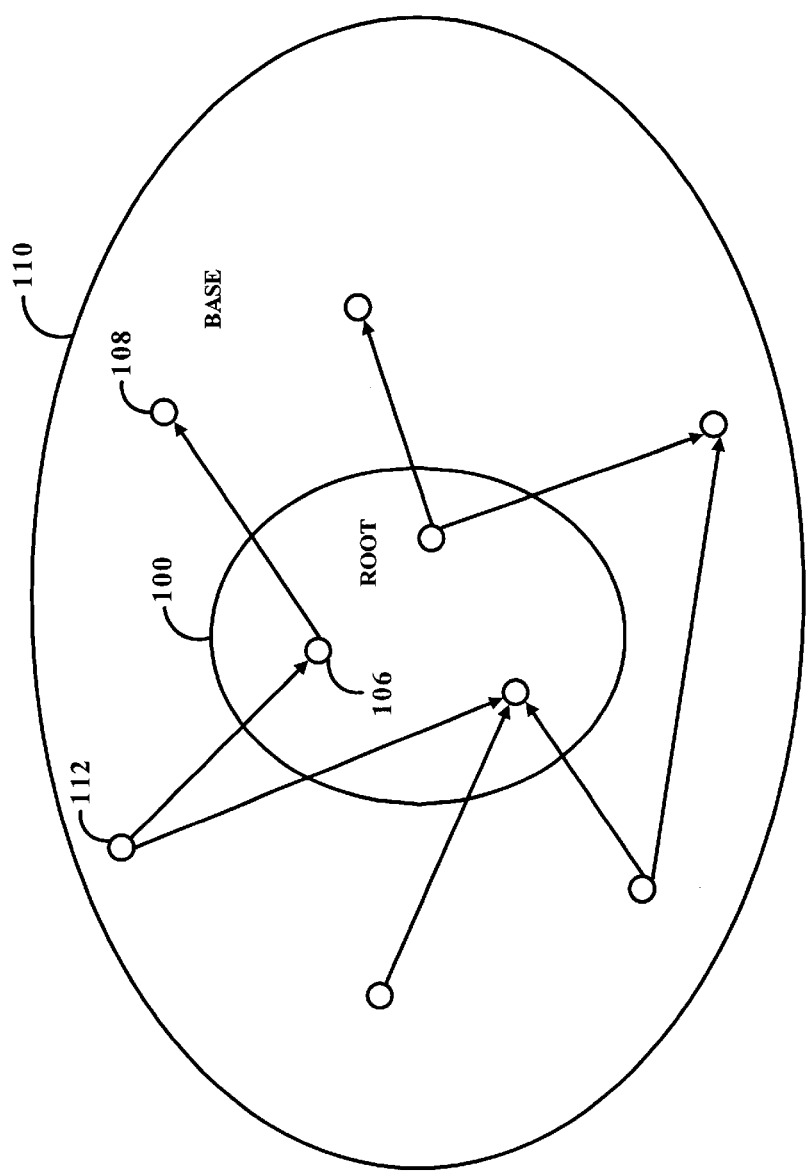
FIG. 1 illustrates the generation of a base set of pages from a root set.

While this invention is illustrated and described in a preferred embodiment, many variations of the method may be implemented still within the spirit of the present invention. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

A brief digression into the preferred algorithm in which structure evaluation and penalization is implemented helps to explain the motivation for and advantages of structure based determination of authoritative pages and additionally provides a framework for implementing the present invention. Specifically, a more detailed description of Kleinberg's algorithm will be given.

In order to implement the algorithm to determine authoritative pages based upon the link structure of the hyperlinked media, a subgraph of the WWW on which the algorithm will operate must be determined. Ideally, this subgraph should be focused to pages which have the following properties:

relatively small many relevant pages contains most, or many, of the strongest authoritative pages FIG. 1 illustrates the generation of a set of pages which fit the above criteria. In order to obtain a set of pages fitting the criteria listed above, the t (typically 200) highest ranked pages for a particular broad-topic search query from a typical text search engine such as Altavista® or Hotbot® is obtained. These t pages are referred to as the root set 100.

This set satisfies the first two criteria, however, generally does not satisfy the third. This is due to the fact that, as detailed by Kleinberg, many times the strongest authoritative pages are not the ones which utilize the search query term in a manner that favors it in a text-based ranking function, and therefore it is likely that a root set will not contain these pages.

A set which does satisfy the third criteria can, however, be generated from root set 100. Although the strong authorities may not be located within root set 100, it is likely that they will be pointed to or point to pages located within root set 100. Therefore, by expanding the root set 100 along the lines entering and leaving the root set 100, i.e. include the pages which are linked to pages in root set 100, a base set 110 meeting the criteria can be formed. For instance, page 106 of root set 100 contains a link to page 108, or in other words points to page 108. By following the lines out of root set 108, the pages pointed to by root set 100 are included in the graph. Likewise, page 112 contains a link to page 106, i.e. 106 is pointed to by 112. By tracing back the lines which enter root set 100, the pages which point to pages within root set 100 are also included in the graph. With the inclusion of both sets of pages, a base set 110 is formed which meets all of the criteria enumerated above. In addition, as described by Kleinberg, the number pages brought into base set 110 by tracing back the lines entering root set 100 may be limited so as to ensure the base set 110 still meets the first criteria. For instance, for each page in the root set, the number of pages pointing to a page which are included to form the base set is limited to 50.

Figure 2:
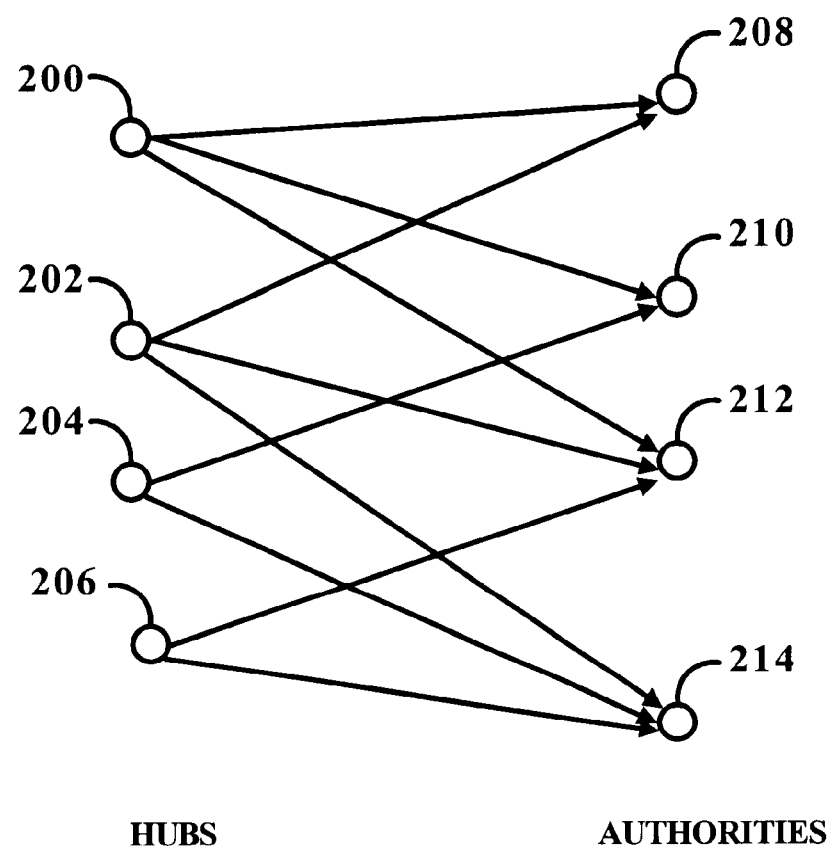
FIG. 2 illustrates the relationship between hubs and authorities.

As briefly described above, Kleinberg utilizes the concept of authorities and hubs to determine the strongest authorities within base set 110. FIG. 2 illustrates the relationship between hubs and authorities. Hubs are those pages which point to many of the authorities, while authorities are those pages which are pointed to by many hubs. As shown, hub 200 points to three authorities 208, 210, and 212, while authority 208 is pointed to by two hubs 200 and 202.

Figure 3:
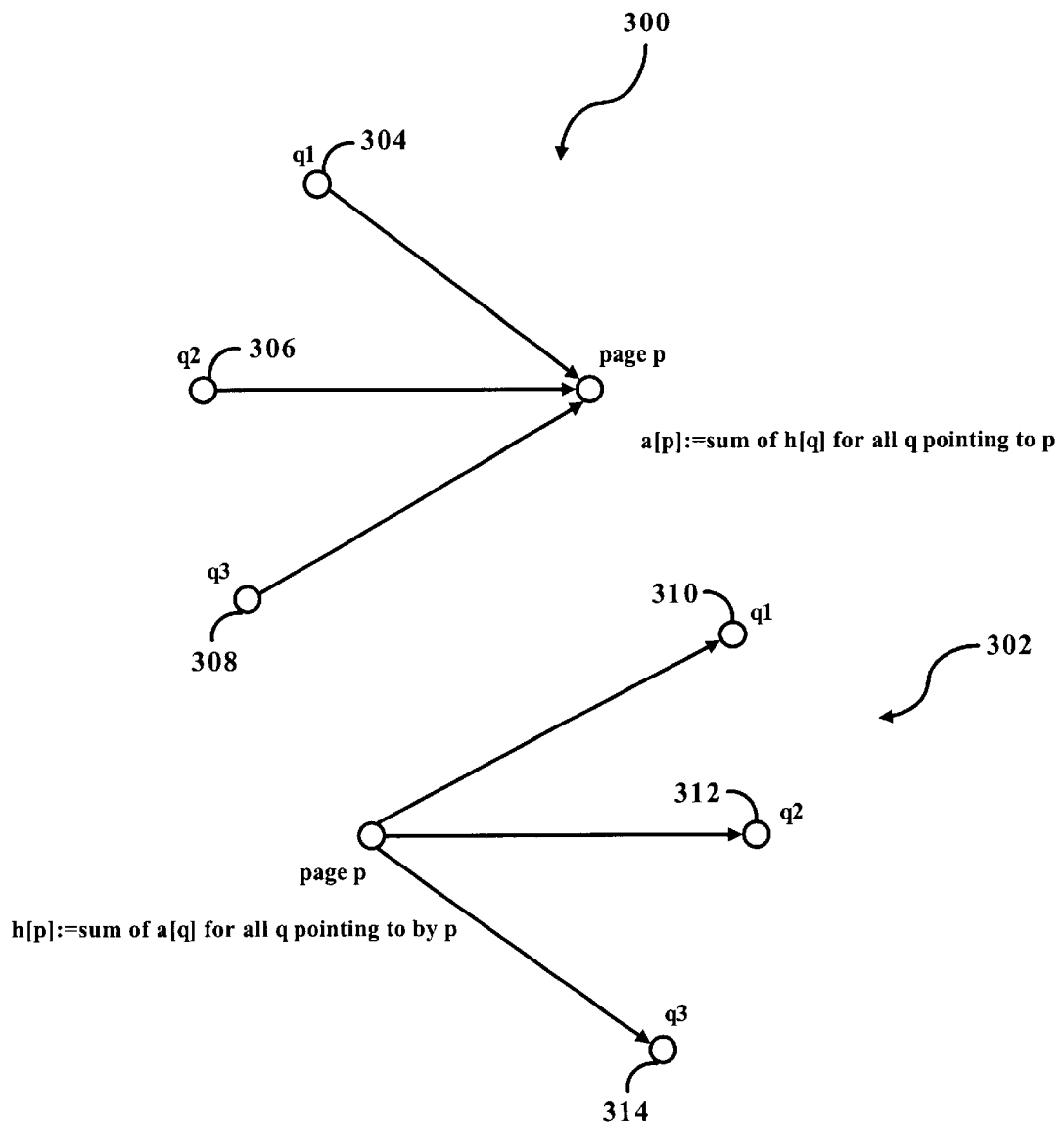
FIG. 3 illustrates the two aspects of the iterative algorithm to update authority and hub weights.

In order to determine the strongest authorities utilizing the hub and authority model, an iterative algorithm is used to break the circularity between hubs and authorities. FIG. 3 illustrates the two aspects of the iterative algorithm. The algorithm maintains and updates weights given to each page p. Each page is given and authority weight a[p] and a hub weight h[p]. All page weights are initialized to 1, i.e. $a_0$ and $h_0$ for each page are set to 1. For each round of the algorithm, the authority weights of a page are updated by summing the hub weights of each page pointing to the page, while the hub weights of a page are updated by summing the authority weights of each page which is pointed to by the page whose hub weight is being determined. As shown in FIG. 3, a[p] for page p is calculated utilizing pages 304, 306, 308 as these pages point to page p. The hub weights q1, q2, q3 of each page are summed together and assigned as the authority weight for the page p. A hub weight for page p is then calculated by summing the authority weights q1, q2, q3 of the pages page p points to 310, 312, and 314. After the updating of the authority and hub weights of each page is performed, the invariant is maintained that the weights of each type are normalized so that the sum of their squares equals 1, i.e. $\Sigma_{p \epsilon base} a[p]^2 = 1$ and $\Sigma_{p \epsilon base} h[p]^2 = 1$.

As shown by Kleinberg, the above procedure converges as the iterations increase arbitrarily. Therefore, by choosing a sufficiently high enough number of iterations N, the weights of the c largest coordinates of each vector of weights, i.e. the c highest hub and authority weights in the entire base set 110, become stable. Typically, N=20 is sufficient for c in the range of 5–10. After the iterations are completed, the algorithm returns the pages having the c highest authority weights as authorities on the query.

Figure 4:
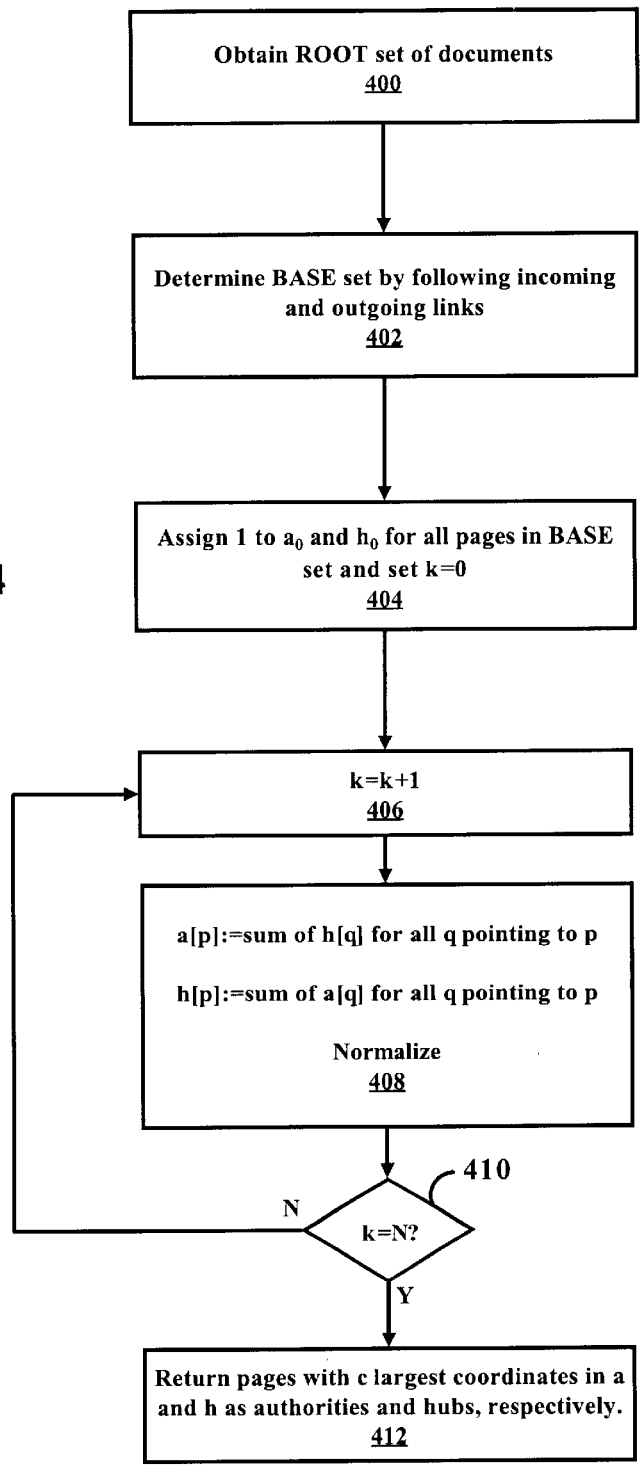
FIG. 4 illustrates the overall algorithm for determining authority pages on a broad-topic search regardless of page structure.

For clarity, FIG. 4 provides an illustration of the overall algorithm for determining authority pages on a broad-topic search as presented by Kleinberg. First a root set of pages is obtained 400 by taking a number of the highest ranked pages returned from a text-based search and ranking function. Next, the root set is expanded to a base set by following the lines entering and leaving the root set 402. Each page in the base set then has its initial hub $h_0$ and authority $a_0$ weights initialized to 1, 404. The iterative algorithm is then entered as illustrated at 406, 408, and 410. At each iteration, hub and authority weights are updated 408. Authority weights are updated by summing the hub weights of all the pages which point to the page being evaluated, while hub weights are updated by summing the authority weights of each page pointed to by the page being evaluated. After updating of the weights is completed, the weights are normalized 408. After N iterations, the pages with the c largest coordinates in the weight vectors are returned as hubs and authorities, with the highest authorities being presented as authorities on the query topic.

Unlike the present invention, the algorithm of Kleinberg provides equal initial weighting to all pages and does not weight the authority and hub weights during the iterations. Therefore, Kleinberg does not favor/disfavor any of the pages and therefore is limited to determining the strongest authorities regardless of any other criteria concerning the page. However, as described above, particular advantages are obtained by penalizing pages which do not have well formed pages. Briefly, in order to penalize pages, accessibility scores (structure scores) are determined for each paged based upon the how well formed the web pages are and these scores are utilized as the initial hub and authority scores. These scores are then utilized to weight the authority and hub weights during the iterations performed to update the authority and hub scores. Therefore the algorithm is biased to favor not only the strongest authorities, but the strongest authorities which are the most well-formed.

Generally, to compute the structure scores, a set of parameters P is determined which will contribute to a decision of how well formed the pages are. Some exemplary parameters include the following:

Does the page form a well-formed XML document? If not, what is the tree-distance of the page from being a well formed XML document so that an XML parser can recover meaningfully from the poorly formed page?

What is the percentage of scripts in the page and what are they used for?

Are there meaningful ALT tags for items such as link structures, images, and video?

Of course, all of the instances in the current guidelines provided by the World Wide Web Consortium can be utilized as parameters, as well as future instances added, in addition to other parameters which may become an issue based upon the type of device, particular ability of a pre-processing system to process an HTML document for display (visual, auditory, tactile, etc.), or particular limited ability of a user of any such system.

For each parameter of P, $p_0, p_1, p_2 \ldots p_n$, scores, $s_0, s_1, s_2 \ldots s_n$ are determined. Each of the scores are then weighted and summed together to create a structure score for the page, i.e. $S=\Sigma x_i s_i$. The structure scores for each page are then scaled to be between 0 and 1, 0 meaning the page fails all of the requirements for accessibility and structure and 1 meaning the page meets all of the requirements. Alternatively, the scale of the final structure score can be taken into account when performing the weighting and summing. One exemplary method of making the final structure score to be between 0 and 1 is to set $\Sigma x_i=1$ such that $0 \leq x_i \leq 1$ and scale $s_i$ to be between 0 and 1.

Figure 5:
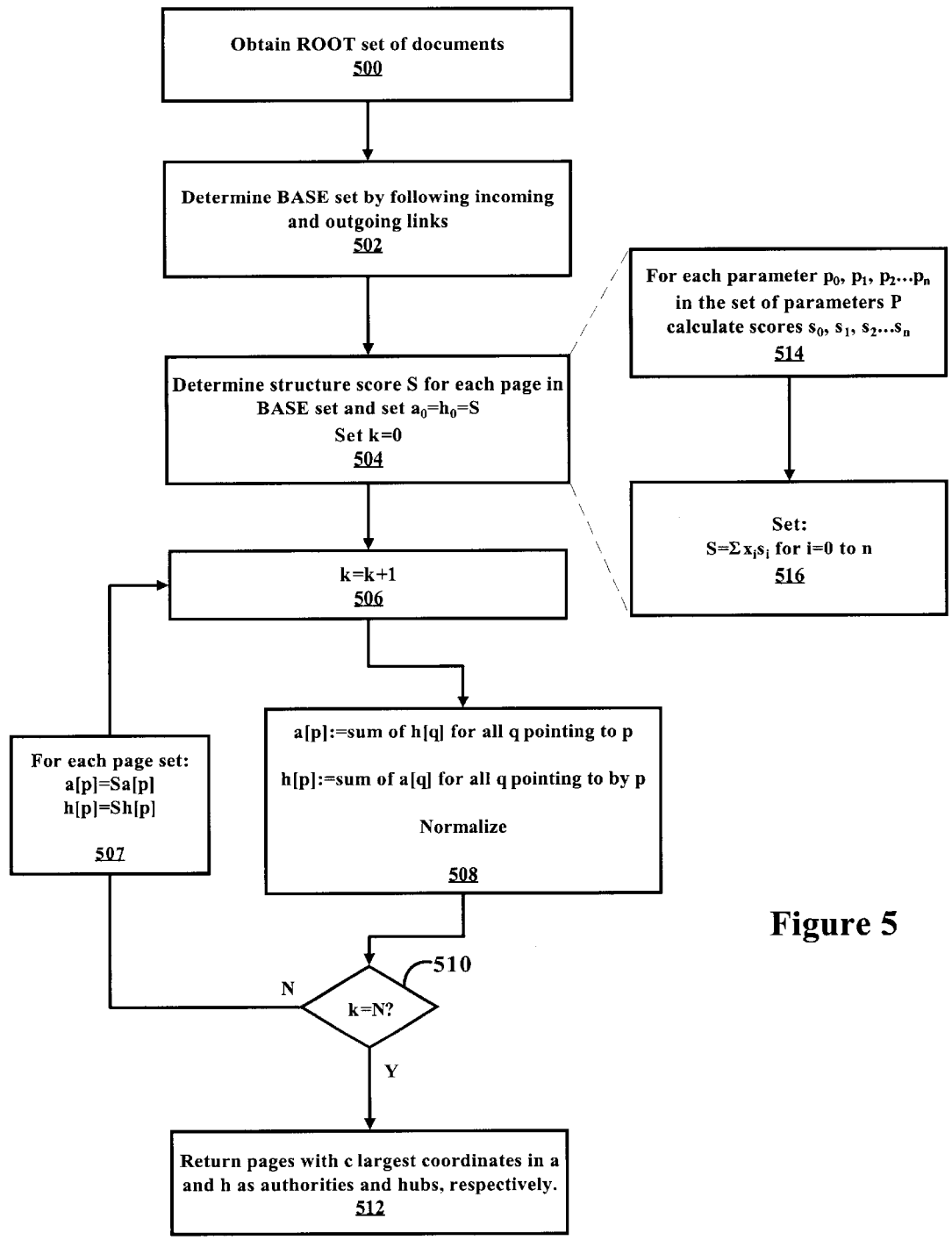
FIG. 5 illustrates the overall algorithm for structure based determination of authoritative pages on a broad-topic search.

FIG. 5 illustrates the overall algorithm for structure based determination of authoritative pages on a broad-topic search. First a root set of pages is obtained 500 by taking a number of the highest ranked pages returned from a text-based search and ranking function. Next, the root set is expanded to a base set by following the lines entering and leaving the root set 502. A structure score is then determined for each page in the base set and the structure score is assigned to the initial authority and hub weights 504. As shown by the breakouts at 514 and 516, to determine the structure score, for each parameter $p_0, p_1, p_2 \ldots p_n$ a score $s_0, s_1, s_2 \ldots s_n$ is determined 514. At 516 the structure score is set by $S=\Sigma x_i s_i$ where the $x_i$ represent weighting values for each parameter. Then, the initial hub and authority weights, $a_0$ and $h_0$, are set equal to S 504. The weighting values allow the adjustment of how a given parameter contributes to the overall structure score. These scores are then normalized to maintain the invariance. The iterative algorithm is then entered as illustrated at 506, 507, 508, and 510. At each iteration, hub and authority weights are updated 508. Authority weights are updated by summing the hub weights of all the pages which point to the page being evaluated, while hub weights are updated by summing the authority weights of each page pointed to by the page being evaluated. After updating of the weights is completed, the weights are normalized 508. As seen at 507 for each iteration the hub and authority weights of each page are further weighted by the structure score S of that page by multiplying the authority and hub weights by the structure score S. After N iterations, the pages with the c largest coordinates in the weight vectors are returned as hubs and authorities, with the highest authorities being presented as the most well-formed authorities on the query topic.

It should be noted, that while the algorithm has been described as initially setting the hub and authority weights equal to the structure score and weighting the hub and authority weights by the structure score during each iteration, as one of skill in the art would understand, initializing the weights to one and multiplying the initial weights by the structure score is equivalent to setting the initial weights to the structure score. Therefore, an equivalent algorithm is able to be constructed in which the initial hub and authority weights are set to one and the hub and authority weights are weighted by the structure score prior to performing the update.

Figure 6:
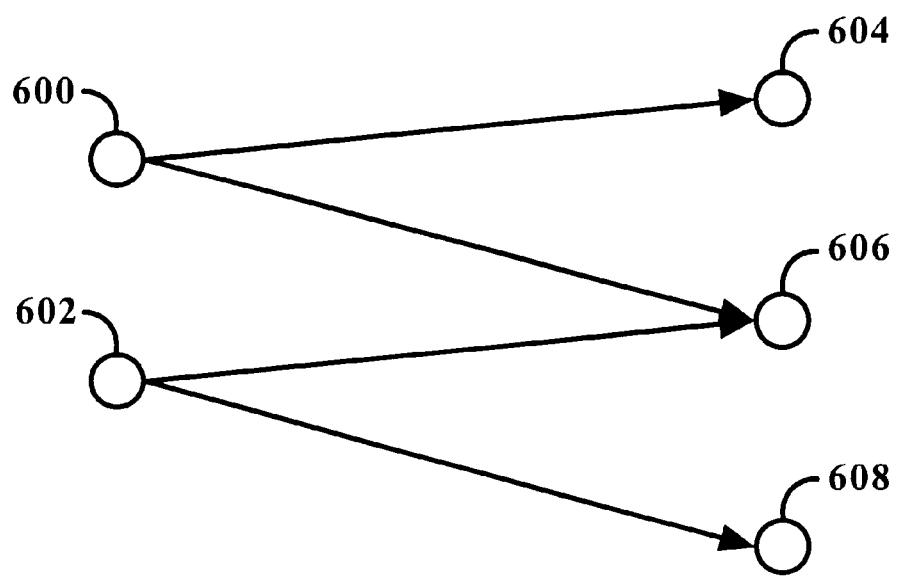
FIG. 6 illustrates a sample nodal system for which structure-based weighting of authoritative and hub pages is performed.

The following charts show the normalized authority and hub scores at each iteration, with and without structure weighting, for the simple 5 node system in FIG. 6. The initial normalized authority and hub weights and final authority and hub scores are shown in bold (after convergence).

| | WITHOUT STRUCTURE WEIGHTING | | | | | |
|---|---|---|---|---|---|---|
| | a0 | h0 | a1 | h1 | a2 | h2 |
| | BEFORE NORMALIZATION: | | | | | |
| 600 | 1.00 | 1.00 | 0.00 | 1.22 | 0.00 | 1.22 |
| 602 | 1.00 | 1.00 | 0.00 | 1.22 | 0.00 | 1.22 |
| 604 | 1.00 | 1.00 | 0.45 | 0.00 | 0.71 | 0.00 |
| 606 | 1.00 | 1.00 | 0.89 | 0.00 | 1.41 | 0.00 |

-continued

| WITHOUT STRUCTURE WEIGHTING | | | | | | |
|---|---|---|---|---|---|---|
| | a0 | h0 | a1 | h1 | a2 | h2 |
| 608 | 1.00 | 1.00 | 0.45 | 0.00 | 0.71 | 0.00 |
| NORMALIZED: | | | | | | |
| 600 | 0.45 | 0.45 | 0.00 | 0.71 | 0.00 | 0.71 |
| 602 | 0.45 | 0.45 | 0.00 | 0.71 | 0.00 | 0.71 |
| 604 | 0.45 | 0.45 | 0.41 | 0.00 | 0.41 | 0.00 |
| 606 | 0.45 | 0.45 | 0.82 | 0.00 | 0.82 | 0.00 |
| 608 | 0.45 | 0.45 | 0.41 | 0.00 | 0.41 | 0.00 |

| WITH STRUCTURE WEIGHTING | | | | | | | |
|---|---|---|---|---|---|---|---|
| | a0 | h0 | a1 | h1 | a2 | h2 | a3 | h3 |
| BEFORE NORMALIZATION: | | | | | | | |
| 600 | 1.00 | 1.00 | 0.00 | 0.67 | 0.00 | 0.67 | 0.00 | 0.67 |
| 602 | 0.25 | 0.25 | 0.00 | 0.28 | 0.00 | 0.29 | 0.00 | 0.29 |
| 604 | 1.00 | 1.00 | 0.36 | 0.00 | 0.55 | 0.00 | 0.55 | 0.00 |
| 606 | 0.60 | 0.60 | 0.38 | 0.00 | 0.61 | 0.00 | 0.61 | 0.00 |
| 608 | 0.60 | 0.60 | 0.02 | 0.00 | 0.06 | 0.00 | 0.06 | 0.00 |
| NORMALIZED: | | | | | | | |
| 600 | 0.60 | 0.60 | 0.00 | 0.92 | 0.00 | 0.92 | 0.00 | 0.92 |
| 602 | 0.15 | 0.15 | 0.00 | 0.38 | 0.00 | 0.40 | 0.00 | 0.40 |
| 604 | 0.60 | 0.60 | 0.68 | 0.00 | 0.67 | 0.00 | 0.67 | 0.00 |
| 606 | 0.36 | 0.36 | 0.73 | 0.00 | 0.74 | 0.00 | 0.74 | 0.00 |
| 608 | 0.36 | 0.36 | 0.04 | 0.00 | 0.07 | 0.00 | 0.07 | 0.00 |

The system illustrated without the structure weights is equivalent to the system of Kleinberg. By looking at the final authority scores, it can be seen that without the structure weights nodes 604 and 608 have equal weights and therefore would be seen as equal. In contrast, the same nodes in the system utilizing structure scores have vastly different final authority scores.

The following is an example calculation for calculating the authority score at each iteration for node 604. This node is pointed to by node 600 only, where n is the normalization function over the sum of the squares.

Without Structure Weighting:

$$a0[604]=0.45$$

$$a1[604]=n(h0[600])=0.41$$

$$a2[604]=n(h1[600])=0.41$$

With Structure Weighting:

$$a0[604]=0.60$$

$$a1[604]=n(h0[600]*h0[600])=n(0.60*0.60)=0.68$$

$$a2[604]=n(h0[600]*h1[600])=n(0.60*0.92)=0.67$$

$$a3[604]=n(h0[600]*h2[600])=n(0.60*0.92)=0.67$$

The above enhancements to hyperlinked document search systems and their described functional elements are implemented in various computing environments. For example, the present invention may be implemented on a conventional IBM PC or equivalent, multi-nodal system (e.g. LAN) or networking system (e.g. Internet, WWW, and wireless web). All programming and data related thereto are stored in computer memory, static or dynamic, and may be retrieved by the user in any of: conventional computer storage, display (i.e. CRT) and/or hardcopy (i.e. printed) formats.

Conclusion

A system and method has been shown in the above embodiments for the effective implementation of a method to determine the documents of a hyperlinked environment which are authorities on a given topic which most closely meet guidelines related to document structure. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and hyperlinked environment. It is further envisioned the system can additionally be utilized in conjunction with textual based analysis systems along with other variants of the algorithm to perform classification, clustering, targeted crawling and identification of micro-communities.

What is claimed is:

1. A method of determining a set of well-formed hyperlinked documents based upon an analysis of the links between and structure of documents within a larger set of hyperlinked documents, said well-formed hyperlinked documents being authorities on a specified topic, said method comprising:

obtaining a base set of hyperlinked documents containing documents relevant to said specified topic and documents which are authorities on said specified topic;

determining a structure score for each document within said base set;

setting an authority weight and a hub weight of each document equal to said document's corresponding structure score;

for each document, updating said authority weight of the document to equal a sum of hub weights of all documents within said base set pointing to the document;

for each document, updating said hub weight of the document to equal a sum of authority weights of all documents within said base set the document is pointing to;

identifying a predetermined number of documents having the highest valued authority weights as said authorities on said specified topic.

2. A method of determining a set of well-formed hyperlinked documents based upon an analysis of the links between and structure of documents within a larger set of hyperlinked documents, said well-formed hyperlinked documents being authorities on a specified topic, as per claim 1, said obtaining step further comprising:

determining a first set of documents utilizing a textual search and ranking system;

expanding said first set to form said base set by including documents which have links pointing to documents within said first set and documents which are pointed to by links contained in documents of said first set.

3. A method of determining a set of well-formed hyperlinked documents based upon an analysis of the links between and structure of documents within a larger set of hyperlinked documents, said well-formed hyperlinked documents being authorities on a specified topic, as per claim 2, wherein an amount of said documents which have links pointing to documents within said first set included to form said base set is limited to a predetermined number for each document within said first set.

4. A method of determining a set of well-formed hyperlinked documents based upon an analysis of the links between and structure of documents within a larger set of hyperlinked documents, said well-formed hyperlinked documents being authorities on a specified topic, as per claim 1, said determining step further comprising:

evaluating a document for conformance to a set of parameters;

determining a parameter score for each parameter of said set of parameters based upon said conformance;

performing a weighted sum of said parameters scores.

5. A method of determining a set of well-formed hyperlinked documents based upon an analysis of the links between and structure of documents within a larger set of hyperlinked documents, said well-formed hyperlinked documents being authorities on a specified topic, as per claim 1, wherein said updating steps are iterated a predetermined number of times and said authority and hub weights are weighted by said structure score during each iteration after an initial update of said authority and hub weights.

6. A method of determining a set of well-formed hyperlinked documents based upon an analysis of the links between and structure of documents within a larger set of hyperlinked documents, said well-formed hyperlinked documents being authorities on a specified topic, as per claim 5, wherein said authority and hub weights are normalized at an end of each iteration.

7. A method of determining a set of well-formed hyperlinked documents based upon an analysis of the links between and structure of documents within a larger set of hyperlinked documents, said well-formed hyperlinked documents being authorities on a specified topic, as per claim 1, wherein said documents are world wide web pages.

8. A method of determining a weight to be assigned to a hyperlinked document, said weight indicative of both the structure of a hyperlinked document and relevance of said document to a specified topic, relative to documents within a focused set of documents when said weight is compared to weights of other documents in said focused set, said method comprising:

calculating a structure score of said hyperlinked document;

setting an authority weight and a hub weight of said hyperlinked document equal to said structure score;

updating said authority weight of said hyperlinked document to equal a sum of hub weights of all hyperlinked documents within said focused set pointing to said hyperlinked document;

updating said hub weight of said hyperlinked document to equal a sum of authority weights of all hyperlinked documents within said focused set said hyperlinked document is pointing to;

wherein said updating steps are iterated a predetermined number of times, said authority and hub weights weighted by said structure score during each iteration after an initial update of said authority and hub weights, and said authority weight and said hub weight are normalized at the end of each iteration.

9. A method of determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 8, said calculating step further comprising:

comparing said document to a set of parameters relevant to proper structure;

setting a parameter score for each of said parameters based upon said comparing;

performing a weighted add of said parameter scores.

10. A method of determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 8, wherein said focused set is obtained via determining a root set of documents which contain web pages relevant to said specified topic and including documents which are pointed to by documents within said root set and documents which point to documents within said root set.

11. A method of determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 10, wherein an amount of said documents which point to documents within said root set included to form said base set is limited to a predetermined number for each document within said root set.

12. A method of determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 10, wherein said root set is determined utilizing a textual search and ranking system.

13. A method of determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 8, wherein said document is a world wide web page.

14. A method of locating web pages which are authorities upon a specified topic and which are well-formed, said method comprising:

obtaining a root set of web pages which contains web pages relevant to said specified topic;

generating a base set of web pages by including pages which are pointed to by pages within said root set and pages which point to pages within said root set;

evaluating each page of said base set for conformance to a set of parameters, said set of parameters relevant to a proper structure of a web page;

determining a structure score for each page based upon said conformance to said set of parameters;

setting an authority weight and a hub weight of each page equal to said page's corresponding structure score;

iteratively updating said authority and hub weights of each page a predetermined number of times, said updating for each page comprising:

setting said authority weight of the page equal to a sum of hub weights of all pages within said base set pointing to the page;

setting said hub weight of the page equal to a sum of authority weights of all pages within said base set the page is pointing to;

normalizing said authority and hub weight;

identifying a predetermined number of pages having the highest valued authority weights as said authorities upon completion of said iterative updating step, and wherein said authority and hub weights are weighted by said structure score during each iteration after an initial update of said authority and hub weights.

15. A method of locating web pages which are authorities upon a specified topic and which are well-formed, as per claim 14, wherein said obtaining step further comprises:

querying a text based search and ranking engine;

discarding all web pages returned by said query beyond a predetermined number of highest ranked web pages returned by said query.

16. A method of locating web pages which are authorities upon a specified topic and which are well-formed, as per claim 14, wherein said determining step further comprises:

setting a parameter score for each of said parameters of said set;

performing a weighted add of said parameter scores.

17. A method of locating web pages which are authorities upon a specified topic and which are well-formed, as per claim 14, wherein a n amount of said pages which point to pages within said root set included to form said base set is limited to a predetermined number for each page within said root set.

18. A method of searching the world wide web to locate authoritative web pages on a specified topic which are structured to be highly accessible regardless of limitations imposed upon a consumer of said web page, said method comprising:

searching said world wide web to obtain a root set of pages, a portion of said root set relevant to said specified topic;

expanding said root set to a base set of pages by including pages pointing to pages within said root set and pages pointed to by said pages in said root set;

determining a structure score and setting a hub weight and an authority weight equal to said structure score for each page within said base set, said structure score determined by evaluating each page according to a set of parameters, said parameters relevant to a proper structure of a web page;

iteratively updating said authority and hub weights of each page a predetermined number of times, said updating for each page comprising:

setting said authority weight of the page equal to a sum of hub weights of all pages within said base set pointing to the page;

setting said hub weight of the page equal to a sum of authority weights of all pages within said base set the page is pointing to;

normalizing said authority and hub weight;

identifying a predetermined number of pages having the highest valued authority weights as said authorities upon completion of said iterative updating step, and wherein said authority and hub weights are weighted by said structure score during each iteration after an initial update of said authority and hub weights.

19. A method of searching the world wide web to locate authoritative web pages on a specified topic which are structured to be highly accessible regardless of limitations imposed upon a consumer of said web page, as per claim 18, wherein said searching step is performed by querying a text based search and ranking engine and said root set is obtained by discarding web pages returned from said query which are beyond a predetermined number of highest ranked web pages returned from said query.

20. A method of searching the world wide web to locate authoritative web pages on a specified topic which are structured to be highly accessible regardless of limitations imposed upon a consumer of said web page, as per claim 18, wherein an amount of said pages pointing to pages within said root set included to form said base set is limited to a predetermined number for each page within said root set.

21. A method of searching the world wide web to locate authoritative web pages on a specified topic which are structured to be highly accessible regardless of limitations imposed upon a consumer of said web page, as per claim 18, said de terminating step further comprising:

comparing said pages to said set of parameters relevant to proper structure;

setting a parameter score for each of said parameters based upon said comparing;

performing a weighted add of said parameter scores to determine said structure score.

22. A system for determining a weight to be assigned to a hyperlinked document, said weight indicative of both the structure of a hyperlinked document and relevance of said document to a specified topic, relative to documents within a focused set of documents when said weight is compared to weights of other documents in said focused set, said method comprising:

a structure calculator, said structure calculator calculating a structure score of said hyperlinked document;

a weight initializer, said weight initializer setting an initial authority weight and an initial hub weight of said hyperlinked document equal to said structure score;

an authority weight updater, said authority weight updater updating said authority weight of said hyperlinked document to equal a sum of hub weights of all hyperlinked documents within said focused set pointing to said hyperlinked document;

a hub weight updater, said hub weight updater updating said hub weight of said hyperlinked document to equal a sum of authority weights of all hyperlinked documents within said focused set said hyperlinked document is pointing to;

wherein said updaters iteratively update said authority and hub weights a predetermined number of times and normalizes said authority weight and said hub weight at the end of each iteration and said authority and hub weights are weighted by said structure score during each iteration after an initial update of said authority and hub weights.

23. A system for determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 22, said structure calculator comprising:

a comparator, said comparator comparing said document to a set of parameters relevant to proper structure;

a parameter score assigner, said parameter score assigner assigning a parameter score for each of said parameters based upon said comparing;

an adder, said adder performing a weighted add of said parameter scores.

24. A system for determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 22, wherein said focused set is obtained via determining a root set of documents which contain web pages relevant to said specified topic and including documents which are pointed to by documents within said root set and documents which point to documents within said root set.

25. A system for determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 24, wherein an amount of said documents which point to documents within said root set included to form said base set is limited to a predetermined number for each document within said root set.

26. A system for determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 24, wherein said root set is determined utilizing a textual search and ranking system.

27. A system for determining a weight to be assigned to a hyperlinked document, said weight indicative of both the structure of a hyperlinked document and relevance of said document to a specified topic, relative to documents within a focused set of documents when said weight is compared to weights of other documents in said focused set, as per claim 22, wherein said document is a world wide web page.

28. An article of manufacture comprising a computer usable medium having computer readable program code embodied therein which determines a weight to be assigned to a hyperlinked document, said weight indicative of both the structure of a hyperlinked document and relevance of said document to a specified topic, relative to documents within a focused set of documents when said weight is compared to weights of other documents in said focused set, said computer readable program code comprising:
  computer readable program code for calculating a structure score of said hyperlinked document;
  computer readable program code for setting an authority weight and a hub weight of said hyperlinked document equal to said structure score;
  computer readable program code for updating said authority weight of said hyperlinked document to equal a sum of hub weights of all hyperlinked documents within said focused set pointing to said hyperlinked document;
  computer readable program code for updating said hub weight of said hyperlinked document to equal a sum of authority weights of all hyperlinked documents within said focused set said hyperlinked document is pointing to;
  wherein said updating steps are iterated a predetermined number of times, said authority and hub weights are weighted by said structure score during each iteration after an initial update of said authority and hub weights and said authority weight and said hub weight are normalized at the end of each iteration.

29. An article of manufacture comprising a computer usable medium having computer readable program code embodied therein which locates web pages which are authorities upon a specified topic and which are well-formed, said computer readable program code comprising::
  computer readable program code for obtaining a root set of web pages which contains web pages relevant to said specified topic;
  computer readable program code for generating a base set of web pages by including pages which are pointed to by pages within said root set and pages which point to pages within said root set;
  computer readable program code for evaluating each page of said base set for conformance to a set of parameters, said set of parameters relevant to a proper structure of a web page;
  determining a structure score for each page based upon said conformance to said set of parameters;
  computer readable program code for setting an authority weight and a hub weight of each page equal to said page's corresponding structure score;
  computer readable program code for iteratively updating said authority and hub weights of each page a predetermined number of times, said computer readable program code for updating comprising:
    computer readable program code for setting said authority weight of the page equal to a sum of hub weights of all pages within said base set pointing to the page;
    computer readable program code for setting said hub weight of the page equal to a sum of authority weights of all pages within said base set the page is pointing to;
    computer readable program code for normalizing said authority and hub weight;
  computer readable program code for weighting said authority and hub weights by said structure score during each iteration after an initial update of said authority and hub weights; and
  computer readable program code for identifying a predetermined number of pages having the highest valued authority weights as said authorities upon completion of said iterative updating step.

* * * * *